(12) United States Patent
Chen et al.

(10) Patent No.: US 7,584,380 B2
(45) Date of Patent: Sep. 1, 2009

(54) METHOD AND SYSTEM FOR DEBUGGING FLOW CONTROL BASED DESIGNS

(75) Inventors: Jiann-Tsuen Chen, Saratoga, CA (US); Guang-Ting Shih, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 583 days.

(21) Appl. No.: 10/981,178

(22) Filed: Nov. 4, 2004

(65) Prior Publication Data

US 2006/0069954 A1    Mar. 30, 2006

Related U.S. Application Data

(60) Provisional application No. 60/609,769, filed on Sep. 14, 2004.

(51) Int. Cl.
*G06F 11/00* (2006.01)

(52) U.S. Cl. .................. 714/30; 714/27; 714/43

(58) Field of Classification Search ............ 714/25, 714/27, 30, 43, 46, 51
See application file for complete search history.

(56) References Cited

U.S. PATENT DOCUMENTS 5,978,870 A * 11/1999 Warren ................ 714/30
6,189,140 B1 * 2/2001 Madduri ............... 714/34
6,282,592 B1 * 8/2001 Aston et al. ........... 714/30

\* cited by examiner

*Primary Examiner*—Robert Beausoliel
*Assistant Examiner*—Joseph D Manoskey
(74) *Attorney, Agent, or Firm*—McAndrews, Held & Malloy, Ltd.

(57) ABSTRACT

Certain embodiments for debugging mechanism for flow control based designs may comprise a debugging interface module between a transmitter and a receiver, all integrated on a chip. At least one debugging entity, which may be on the chip or off the chip, may indicate to the debugging interface module to initiate debug mode via command signals. In debug mode, the control signals between the transmitter and the receiver may be intercepted by the debugging interface module to halt normal data flow from the transmitter to the receiver. The debugging entity may then transmit data to the receiver, while the transmitter is disabled, or receive data transmitted by the transmitter, while the receiver is disabled. When the debugging entity indicates to the debugging interface module to end debug mode, normal data flow may continue, and the debugging interface module may appear transparent to the data flow.

32 Claims, 7 Drawing Sheets

METHOD AND SYSTEM FOR DEBUGGING FLOW CONTROL BASED DESIGNS

CROSS-REFERENCE TO RELATED APPLICATIONS/INCORPORATION BY REFERENCE

This application makes reference, claims priority to, and claims the benefit of U.S. Provisional Application Ser. No. 60/609,769 filed Sep. 14, 2004.

The above stated application is hereby incorporated herein by reference in its entirety.

FIELD OF THE INVENTION

Certain embodiments of the invention relate to debugging transfer of signals. More specifically, certain embodiments of the invention relate to a method and system for debugging flow control based designs.

BACKGROUND OF THE INVENTION

There are two general methods of sending messages when communicating, which may include sending messages and data without regard to whether they are received, known as unreliable delivery, or sending messages and data with some effort to making sure that they are received, known as reliable delivery. An example of unreliable delivery is the typical mail sent via US Post Office's first class, second class, or third class services. Mail may be sent but there is no way to know if the mail has been received. Another common example may be radio or television broadcasts where the broadcasting station sends out signals but has no idea if anybody is receiving the signals. A more recent example may be the user datagram protocol (UDP), a connectionless transport protocol sometimes used in Internet data transfers by applications for email or file transfer. The UDP makes no attempts to verify that a sent packet was actually received by an intended recipient. The UDP's task is finished when it places a packet on a network with a destination address. The application program that used the UDP may ensure reliable delivery with a higher-level protocol.

In contrast, there is another protocol, which is utilized for most Internet transmissions, namely transmission control protocol (TCP). TCP provides reliable transmission of data by providing connection-oriented, end-to-end reliable packet delivery through a network or through the Internet. It does this by assigning sequence numbers to packets to indicate to the destination the number of packets and the order of the packets that may be received. The destination should acknowledge receipt of each packet. Packets that are not acknowledged within a specified time period are retransmitted. If the destination does not receive an expected packet within a specified time, it may request that the packet be resent. The reliability mechanism of TCP allows devices to deal with lost, delayed, duplicate, or misread packets.

Electronic systems, such as personal computers (PCs), use both reliable and unreliable messaging systems to transmit data. A typical bus on the PC is an unreliable delivery system where a sender places data on the bus and assumes that the destination will receive the data. An example of a reliable delivery system used by the PC is the IEEE 1284 parallel port standard, often used for communication between a PC and a printer. The PC places a byte of data on the parallel port and asserts a strobe signal. The printer may receive the data and answer the strobe signal by asserting an acknowledge signal. The host may then deassert the strobe signal, place another byte on the parallel port, and reassert the strobe signal. This type of signal exchange for data delivery may be called "handshaking."

A problem with handshaking protocols, especially when the handshaking signals are transmitted over a physical medium, a wire, for example, is that it may be difficult to identify the signals and data that are being transferred during real time operation of a system. This may lead to uncertainty during debugging process since the source of the problem may not be able to be pinpointed. The problem may be further exacerbated with a chip since the circuitry and traces inside the chip usually cannot be accessed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for debugging flow control based designs. Aspects of the method may comprise coupling a debugging interface module between a transmitter and a receiver, where the debugging interface module, the transmitter and the receiver may be integrated on a chip. At least one handshaking signal may be communicated between the transmitter and the debugging interface module, and at least one handshaking signal may be communicated between the debugging interface module and the receiver. Data may be transmitted from the transmitter to the debugging interface module and/or the receiver, and from the debugging interface module to the receiver.

The debugging interface module may be adapted to receive at least one debugging signal from at least one debugging entity, and at least one debugging entity may be located on the chip and/or at least one debugging entity may be located externally to the chip. Data may be communicated between at least one debugging entity and the debugging interface module. At least one debugging signal may indicate to the debugging interface module to initiate debug mode. At least one handshaking signal may be transparently communicated between the transmitter and the receiver via the debugging interface module. This may occur in instances when the debugging interface module may not have initiated the debug mode. The data from the transmitter may also be transparently transmitted to the receiver via the debugging interface module in instances when the debugging interface module may not have initiated the debug mode.

At least one handshake signal from the debugging interface module may be communicated to the transmitter to disable the transmitter when the debugging interface module may not have initiated the debug mode. The debugging interface module may communicate the data received from at least one debugging entity to the receiver when the debugging interface module may have initiated the debug mode. In another aspect of the invention, at least one handshake signal may also be communicated from the debugging interface module to the receiver to disable the receiver when the debugging interface module may have initiated the debug mode. The debugging interface module may communicate the data received from the transmitter to at least one debugging entity when the debugging interface module may have initiated the debug mode.

Aspects of the system may comprise a debugging interface module, a transmitter and a receiver, all integrated on a chip. At least one handshaking signal may be communicated between the transmitter and the debugging interface module, and at least one handshaking signal may communicate between the debugging interface module and the receiver. Data may also be transmitted from the transmitter to the debugging interface module and the receiver, and from the debugging interface module to the receiver. There may also be at least one debugging entity that may be located on the chip and/or off the chip, and the debugging interface module may be coupled so that it receives at least one debugging signal from the debugging entity. Data may also be communicated between at least one debugging entity and the debugging interface module.

At least one debugging signal received by the debugging interface module may indicate initiation of debug mode. At least one handshaking signal may be communicated between the transmitter and the receiver transparently through the debugging interface module when the debugging interface module may not have initiated the debug mode. The transmitter may also transparently transmit the data to the receiver via the debugging interface module in instances when the debugging interface module may not have initiated the debug mode. In addition, the debugging interface module may be adapted to communicate at least one handshake signal to the transmitter to disable the transmitter when the debugging interface module may have initiated the debug mode. In instances when the debugging interface module may have initiated the debug mode, the debugging interface module may communicate the data received from at least one debugging entity to the receiver. The debugging interface module may also communicate at least one handshake signal to the receiver to disable the receiver when the debugging interface module may have initiated the debug mode. In instances when the debugging interface module may have initiated the debug mode, the debugging interface module may communicate the data received from the transmitter to at least one debugging entity.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for debugging flow control based designs. Various aspects of the invention may provide support for a debugging entity that may debug a flow control based design when data is being received or transmitted. The debugging entity may control the data flow by disabling normal handshaking at an entity being debugged and then causing handshake signals to be generated as to make it appear that the entity being debugged may be generating these handshake signals. The control of the data flow may occur in a manner such that the debugging entity may receive data transmitted by a transmitting entity meant to be received by a receiving entity, or transmit data to a receiving entity. A first entity that may be coupled to the debugging entity may not be the entity that is being debugged. Rather, it may be a second entity that is coupled to the first entity that may be debugged, or a path coupling the first and second entities that may be debugged.

Figure 1A:
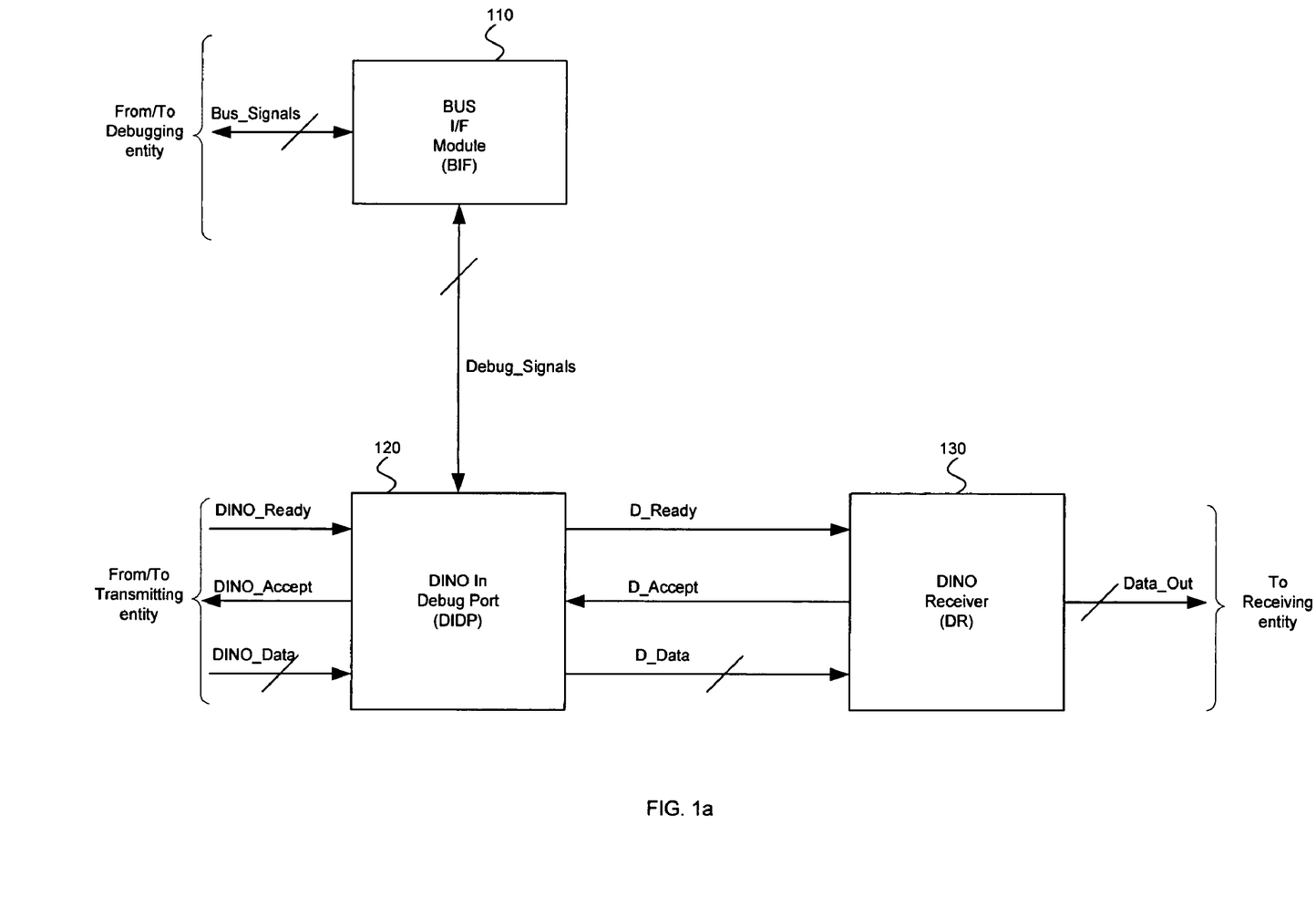
FIG. 1a is a block diagram of an exemplary system for debugging flow control based designs for receiving data in accordance with an embodiment of the invention.

FIG. 1a is a block diagram of an exemplary system for debugging flow control based designs for receiving data, in accordance with an embodiment of the invention. Referring to FIG. 1a, there is shown a bus interface module (BIF) 110, a data in/out (DINO) in debug port (DIDP) 120, and a DINO receiver (DR) 130 of a receiving entity. FIG. 1a further comprises a plurality of signals including at least one bus signal referred to as Bus_Signals, at least one debug signal referred to as Debug_Signals, at least one ready signal referred to as DINO_Ready, at least one accept signal referred to as DINO_Accept, at least one data signal referred to as DINO_Data, at least one ready signal referred to as D_Ready, at least one accept signal referred to as D_Accept, at least one data signal referred to as D_Data, and at least one data signal referred to as Data_Out.

The Bus_Signals may comprise at least one control signal and/or data signal, which may be utilized for communication among a plurality of entities in an electronic system. The Debug_Signals may comprise at least one control signal and/or data signal, at least one of which may provide an indication to the DIDP 120 to indicate that a debug mode may be initiated. The debug mode may comprise a mode in which the transmitting entity may be prevented from sending data to the DR 130 so that the debugging entity may send data to the DR 130. The DINO_Ready may originate from the transmitting entity, which may be intended for the DR 130 and may indicate that the data signal DINO_Data may be valid data for DR 130 to receive. The DINO_Accept may be a signal that may be communicated to a transmitting entity that indicates that data on the DINO_Data may have been accepted. The D_Ready may be generated by the DIDP 120 to the DR 130 that may reflect the state of the DINO_Ready during normal DINO operation. The D_Ready may also indicate whether the debugging entity may be ready to transmit data during the debug mode. During normal operation, the DINO_Accept may be generated by the DIDP 120 and may reflect the state of the D_Accept. The D_Data may be the same data as the DINO_Data during normal operation. During normal operation, the Data_Out may be a latched DINO_Data, and during the debug mode, the Data_Out may comprise data generated by the debugging entity.

The BIF 110 comprises suitable logic, circuitry and/or code that may be utilized to decode addresses and enable latching of data when appropriate data and control signals may be present. The Bus_Signals may be communicated between the BIF 110 and the DIDP 120. The DIDP 120 comprises suitable logic, circuitry and/or code that may be utilized to disable normal handshaking between the DR 130 and the transmitting entity that may be transmitting the DINO_Ready and the DINO_Data, and receiving the DINO_Accept. When indicated to enter the debug mode, the DIDP 120 may prevent the transmitting entity from communicating a new DINO_Data by not asserting the DINO_Accept, and may generate the D_Ready to the DR 130 and communicate the D_Data from the debugging entity to the DR 130, and may receive the D_Accept from the DR 130. The DR 130 comprises suitable logic, circuitry and/or code that may be adapted to receive the D_Ready and the D_Data, and to generate the D_Accept such that the transmitting entity or the debugging entity may send new data.

In operation, the debugging entity may indicate via the Bus_Signals that the debug mode may be started. The BIF 110 may then indicate via the Debug_Signals to the DIDP 120 such that the DIDP 120 may disable transmission of data from the transmitting entity, while the debugging entity may send data via the Bus_Signals to the BIF 110. The data from the debugging entity may then be transmitted to the DIDP 120, and that data may be transmitted from the DIDP 120 to the DR 130. The DR 130 may accept the data and then assert the D_Accept to the DIDP 120. The DIDP 120 may then indicate to the debugging entity that the debugging entity may send new data. When the debugging entity indicates, via the Bus_Signals, that normal operation may be resumed, the DIDP 120 may appear transparent to the transmitting entity and to the DR 130. Additionally, the D_Ready may be the same state as the DINO_Ready, the DINO_Accept may be the same state as the D_Accept, and the D_Data may be the same as the DINO_Data.

Figure 1B:
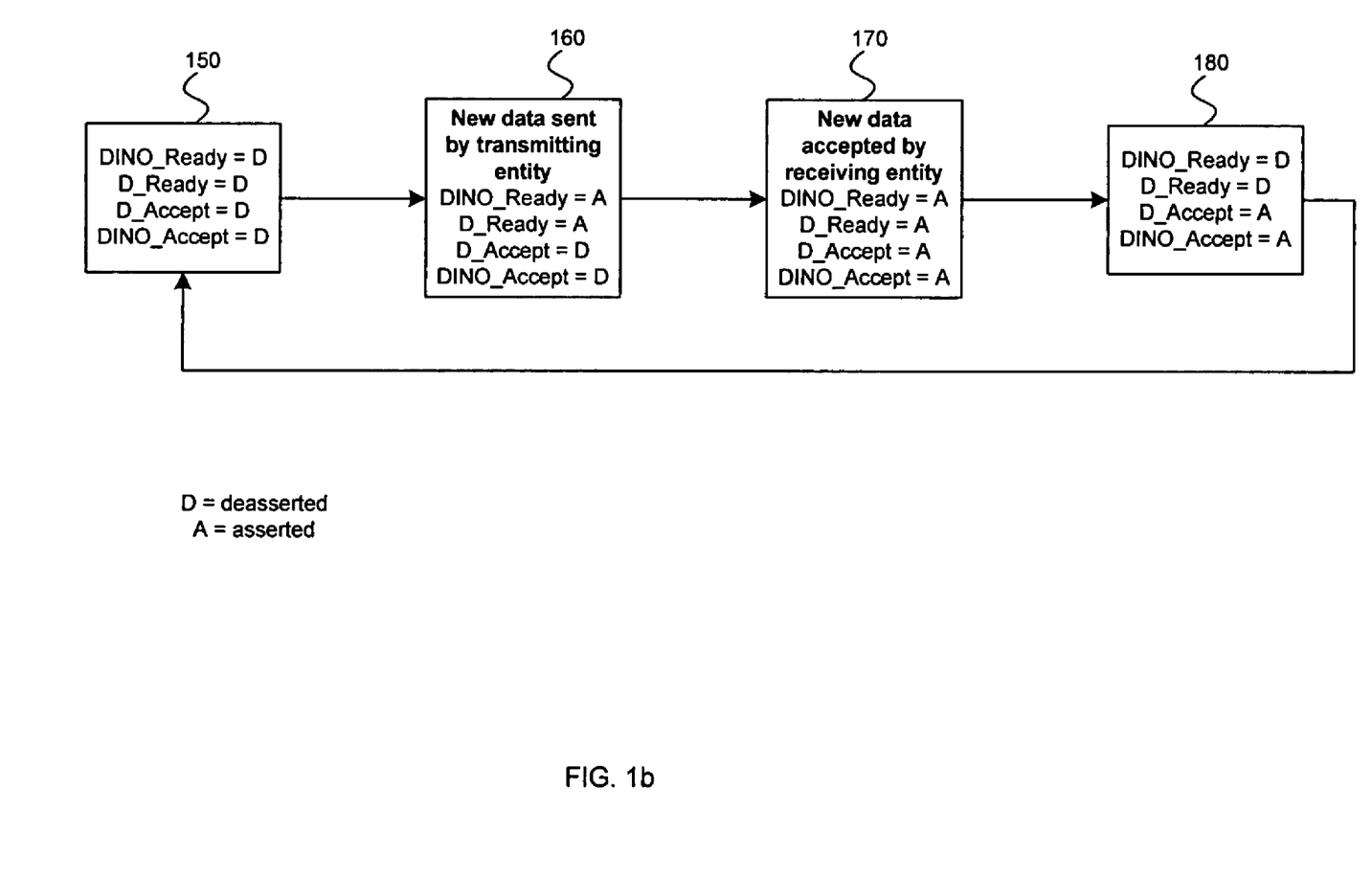
FIG. 1b is a flow chart illustrating exemplary steps for normal data flow from a transmitting entity to a receiving entity, as illustrated in FIG. 1a in accordance with an embodiment of the invention.

FIG. 1*b* is a flow chart illustrating exemplary steps for normal data flow from a transmitting entity to a receiving entity, as illustrated in FIG. 1*a* in accordance with an embodiment of the invention. Referring to FIG. 1*b*, in step 150, an idle state may indicate that the transmitting entity may not have transmitted new data to the receiving entity. This may be indicated by the ready signals DINO_Ready and D_Ready being in a deasserted state and the accept signals D_Accept and DINO_Accept being in a deasserted state. In step 160, the transmitting entity may place new data on the DINO_Data, which may be transferred to the data signal D_Data, and may indicate this by asserting the DINO_Ready, which may result in asserting the D_Ready to the receiving entity. In step 170, the receiving entity may receive the ready signal D_Ready and accept the data on the data signal D_Data, and may indicate this by asserting the D_Accept, which may result in the DINO_Accept being asserted. In step 180, the transmitting entity may receive the DINO_Accept and deassert the ready signal DINO_Ready, which may result in the D_Ready being deasserted. The receiving entity may then deassert the D_Accept, which may result in the DINO_Accept being deasserted, and this may be step 150.

Figure 2A:
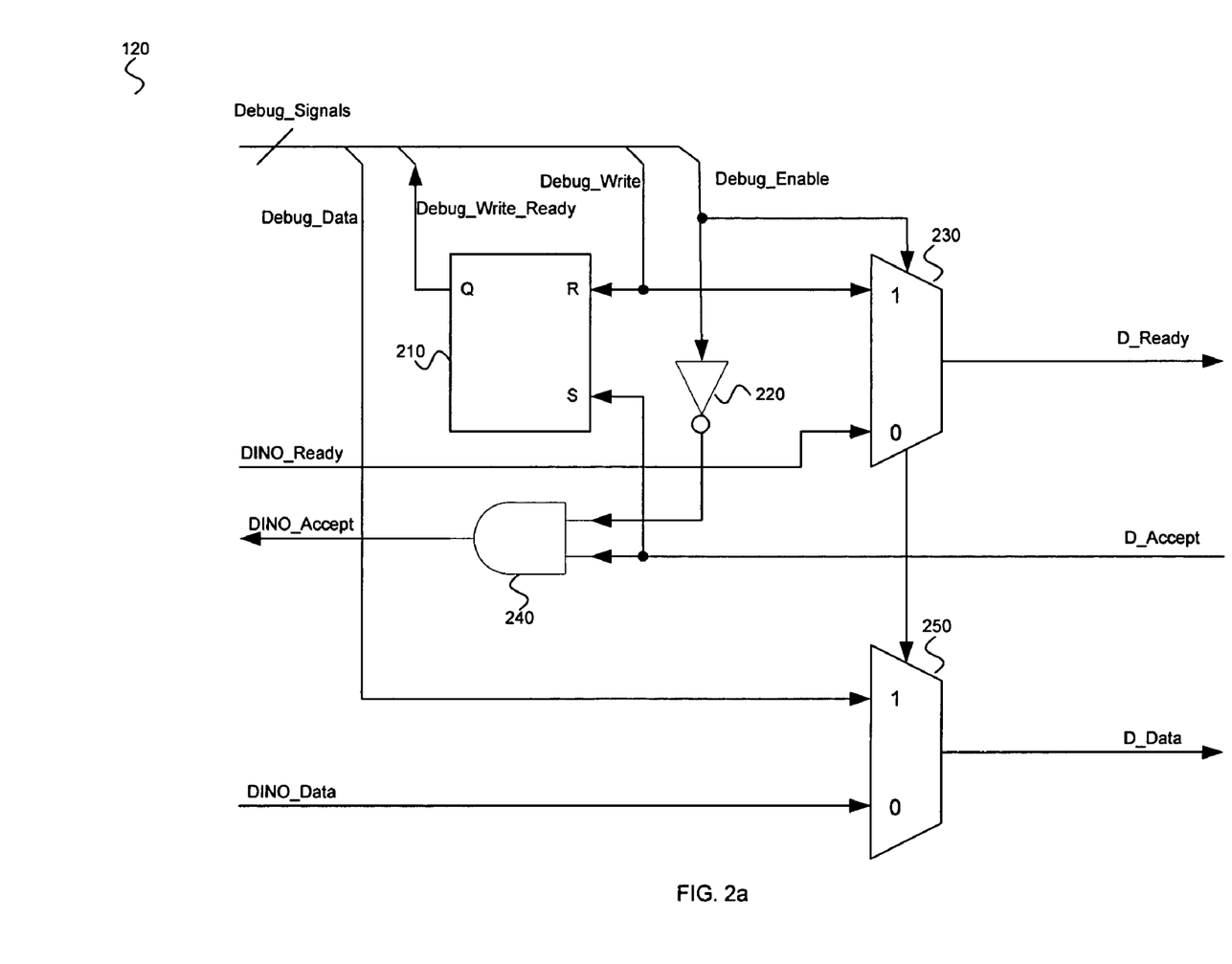
FIG. 2a is a block diagram illustrating an exemplary DINO In Debug Port of FIG. 1a, in accordance with an embodiment of the invention.

FIG. 2*a* is a block diagram illustrating an exemplary DINO In Debug Port of FIG. 1*a*, in accordance with an embodiment of the invention. Referring to FIG. 2*a*, there is shown a flip-flop (FF) 210, an inverter 220, multiplexers 230 and 250, and an AND gate 240. FIG. 2*a* further comprises a plurality of signals including Debug_Signals, DINO_Ready, DINO_Accept, DINO_Data, D_Ready, D_Accept, and D_Data. The Debug_Signals may comprise a plurality of signals including Debug_Data, Debug_Write_Ready, Debug_Write, and Debug_Enable, and these signals may correspond to the signals of the same names in FIG. 1*a*.

At least one debug signal may be referred to as Debug_Data, and the Debug_Data may be the data transmitted by the debugging entity to replace the DINO_Data. At least one debug write signal may be referred to as Debug_Write_Ready, and the Debug_Write_Ready may be generated by the FF 210 to indicate to the debugging entity that new data may be sent. At least one debug write signal may be referred to as Debug_Write, and the Debug_Write may be a signal from the debugging entity that may be utilized to generate the D_Ready. At least one debug enable signal may be referred to as Debug_Enable, and the debug enable signal Debug_Enable may be a signal generated by the debugging entity that may be utilized to initiate the debug mode.

The FF 210 may have two inputs S and R, and an output Q, such that a positive pulse at the input S may set the output Q to a high state, and a positive pulse at the input R may set the output Q to a low state.

The Debug_Enable may be communicated to the inverter 220 and the output of the inverter 220 may be communicated to a first input of the AND gate 240. The Debug_Enable may also be communicated to the multiplexers 230 and 250 such that the Debug_Enable may select one of two inputs to each multiplexer to transfer to the output of each multiplexer. The D_Accept may be communicated to a second input of the AND gate 240, and to the input S of the FF 210. An output of the AND gate 240 may be the DINO_Accept.

The Debug_Write may be communicated to the input R of the FF 210 and to a first input of the multiplexer 230. A second input of the multiplexer 230 may be the DINO_Ready. The output of the multiplexer 230 may be the D_Ready. The output of the FF 210 may be the Debug_Write_Ready. A first input to the multiplexer 250 may be the Debug_Data, a second input to the multiplexer 250 may be the DINO_Data, and an output of the multiplexer 250 may be the D_Data.

In operation, the Debug_Enable may be asserted, and the asserted Debug_Enable may be inverted by the inverter 220 and communicated to the AND gate 240. Therefore, as long as the Debug_Enable is asserted, the output of the AND gate 240, the DINO_Accept, may be deasserted, which may indicate to the transmitting entity that it may not send new data. An asserted Debug_Enable may also indicate to the multiplexer 230 that its first input, the Debug_Write, may be selected, and to the multiplexer 250 that its first input, the Debug_Data, may be selected. The asserted Debug_Write may then be communicated to the DR 130 (FIG. 1*a*) as the D_Ready via the multiplexer 230 to indicate that new data may be ready. The DR 130 may receive the D_Data that may have been communicated to the DR 130 by the multiplexer 250, and the DR 130 may assert the D_Accept to indicate that it has received the D_Data. The asserted D_Accept at the S input of the FF 210 may set the output Q of the FF 210 such that the Debug_Write_Ready may be asserted. This may indicate to the debugging entity that new data may be sent. The debugging entity may send new data, and may assert the Debug_Write. The asserted Debug_Write at the R input of the FF 210 may clear the output Q of the FF 210 such that the Debug_Write_Ready may be deasserted.

In normal mode, the Debug_Enable may be deasserted. Whenever this occurs, the output of the inverter 220 may be asserted and therefore the output DINO_Accept of the AND gate 240 may be the same as the second input D_Accept to the AND gate 240. The deasserted Debug_Enable may also indicate to the multiplexer 230 that the second input, the DINO_Ready, may be selected, and to the multiplexer 250 that the second input, the DINO_Data, may be selected. In this mode, the DINO_Data and the DINO_Ready may be communicated by the transmitting entity to the receiving entity via the DR 130, and the DR 130 may also communicate the D_Accept to the transmitting entity.

Figure 2B:
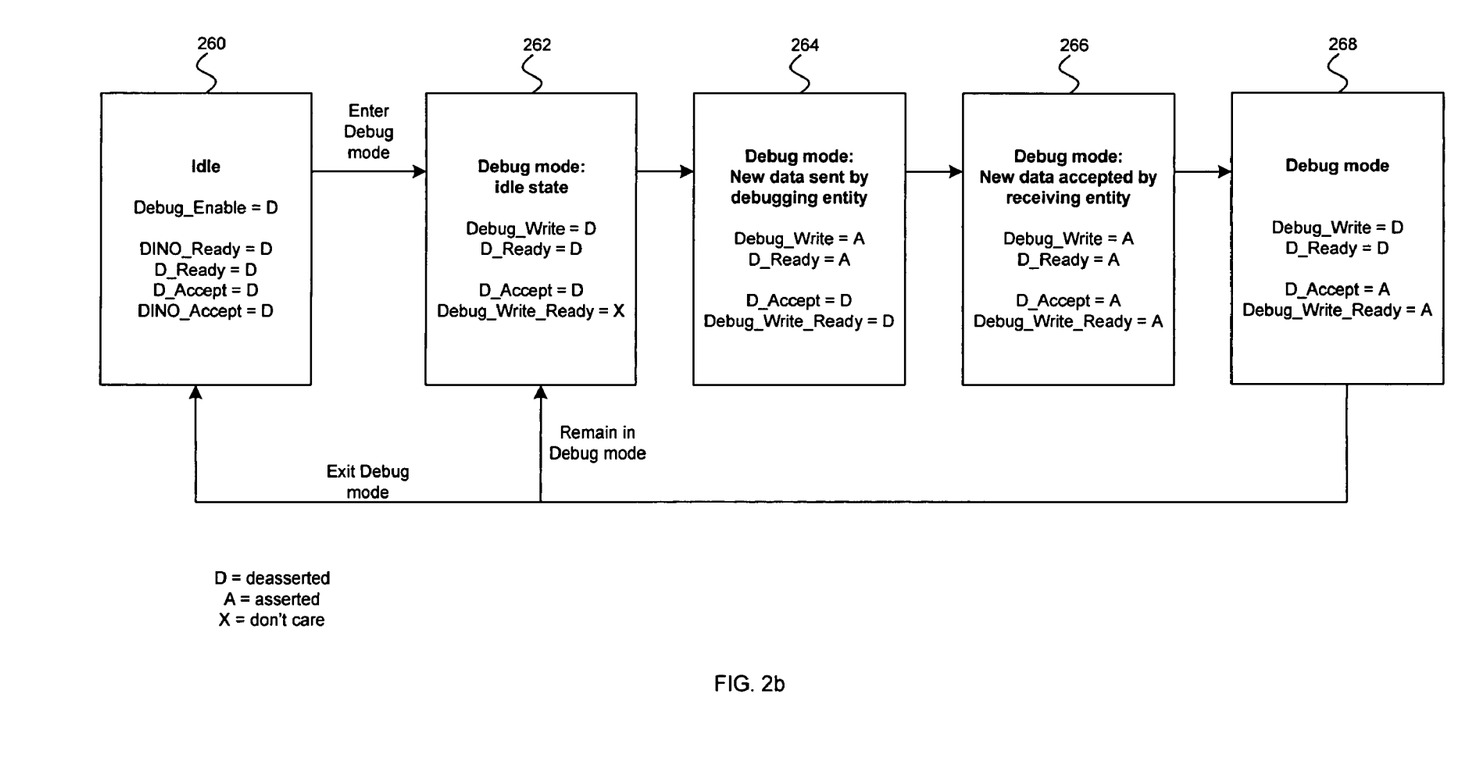
FIG. 2b is a flow chart illustrating exemplary steps for data flow from a debugging entity to a receiving entity, as illustrated in FIG. 2a in accordance with an embodiment of the invention.

FIG. 2*b* is a flow chart illustrating exemplary steps for data flow from a debugging entity to a receiving entity, as illustrated in FIG. 2a in accordance with an embodiment of the invention. Referring to FIG. 2b, a don't care condition for a signal may be indicated by a 'x'. Step 260 may indicate an idle state where the transmitting entity may not have transmitted new data to the receiving entity, and the debugging entity may not have asserted the Debug_Enable. This state may have the ready signals DINO_Ready and D_Ready in a deasserted state and the accept signals D_Accept and DINO_Accept in a deasserted state. In step 262, the debugging entity may have initiated a debug mode where it may disable the transmitting entity from transmitting data so that the debugging entity may transmit data to the receiving entity. In initiating the debug mode, the debugging entity may assert the Debug_Enable to the DIDP 120 (FIG. 1a), which may result in the DINO_Accept being deasserted to the transmitting entity. The transmitting entity may have sent new data via the DINO_Data, but since the DINO_Accept may be deasserted, the data may not be removed nor new data sent via the DINO_Data, until a handshaking sequence between the receiving entity and the transmitting entity may be completed after the debugging entity deasserts the Debug_Enable.

In step 264, the debugging entity may send data via Debug_Data which may be transferred to the D_Data, and assert the Debug_Write which may, in turn, assert the D_Ready. The assertion of Debug_Write may lead to the deassertion of the Debug_Write_Ready. In step 266, The D_Ready may be received by the receiving entity, which may accept the data on the D_Data, and may indicate the acceptance by asserting the D_Accept, which may result in the Debug_Write_Ready being asserted. The asserted Debug_Write_Ready may indicate to the debugging entity that new data may be sent via the Debug_Data.

In step 268, the Debug_Write may be deasserted by the debugging entity, which may result in the D_Ready being deasserted. The receiving entity may then deassert the D_Accept, and this may be step 260 if the debugging entity deasserts the Debug_Enable, or the step 262 if the debugging entity does not deassert the Debug_Enable.

Figure 3:
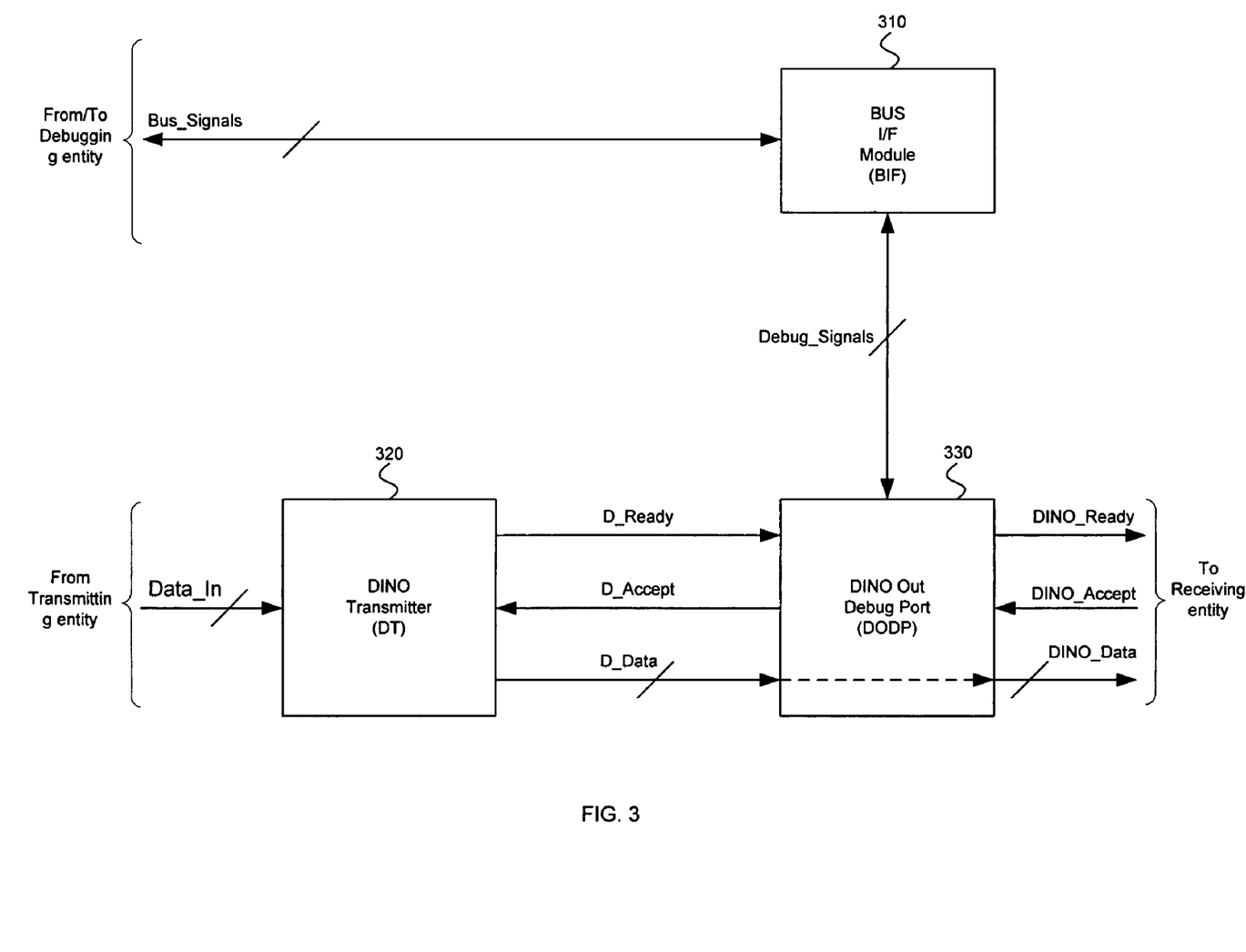
FIG. 3 is a block diagram of an exemplary system for debugging flow control based designs for transmitting data in accordance with an embodiment of the invention.

FIG. 3 is a block diagram of an exemplary system for debugging flow control based designs for transmitting data in accordance with an embodiment of the invention. Referring to FIG. 3, there is shown a bus interface module (BIF) 310, a DINO transmitter (DT) 320, and a data in/out (DINO) out debug port (DODP) 330. FIG. 3 further comprises a plurality of signals including Bus_Signals, Debug_Signals, D_Ready, D_Accept, D_Data, DINO_Ready, DINO_Accept, and DINO_Data, and these signals may correspond to the signals of the same names in FIG. 1a. FIG. 3 further comprises a signal Data_In, which may comprise at least one data signal.

The Debug_Signals may be utilized for activating the DODP 330 such that data that may be transmitted by the DT 320 of the transmitting entity to the receiving entity may be read by the debugging entity. The D_Ready may be a signal from the DT 320 to the DODP 330, which may indicate that the D_Data may be valid. During normal DINO operation, the DINO_Ready may reflect the state of the D_Ready. During the debug mode, the DINO_Ready may be a signal that originates in the DODP 330 and is communicated to the receiving entity that the DINO_Data may not be valid. The DINO_Accept may be a signal to the DODP 330 that indicates that the DINO_Data may have been accepted by the receiving entity. The D_Accept may be a signal generated by the DODP 330 to the DT 320 that may reflect the state of the DINO_Accept during normal operation. During the debug mode, the D_Accept may be a signal that indicates that the D_Data may have been accepted by the debugging entity and that a new D_Data may be communicated. The D_Data may be the data that may be transmitted by the DT 320 to a receiving entity via the DODP 330 during normal operation, or to the debugging entity via the DODP 330 during the debug mode. The Data_In may comprise data from the transmitting entity.

The BIF 310 comprises suitable logic, circuitry and/or code that may be utilized to decode addresses and enable latching of data temporarily when appropriate data and control signals may be present. The Bus_Signals may be communicated between the BIF 310 and the DODP 330. The DODP 330 comprises suitable logic, circuitry and/or code that may be utilized to disable normal handshaking between the DT 320 and the receiving entity that may be receiving the DINO_Ready and the DINO_Data, and transmitting the DINO_Accept. When indicated to enter the debug mode, DODP 330 may disable normal handshaking to the receiving entity and generate handshake signals to the transmitting entity so that the debugging entity may receive the DINO_Data. The transmitting entity may continue to transmit the Data_In and the DODP 330 may send the data from the transmitting entity to the debugging entity via BIF 310. The DT 320 comprises suitable logic, circuitry and/or code that may be utilized to receive the D_Accept and the Data_In, and generate the D_Ready such that the receiving entity may receive the D_Data.

In operation, the debugging entity may indicate via the Bus_Signals that the debug mode may be started. The BIF 310 may then indicate appropriately via the Debug_Signals to the DODP 330 such that the DODP 330 may disable signaling between the DODP 330 and the receiving entity. The receiving entity may wait for data, but the DINO_Ready may not be asserted while the DODP 330 may be in the debug mode. The DODP 330 may then communicate the D_Data to the BIF 310 via the Debug_Signals when the D_Ready indicates that the D_Data may be valid. The DODP 330 may then assert the D_Accept to indicate to the DT 320 that new data may be sent. When the debugging entity indicates, via the Bus_Signals, that normal operation is to be resumed, the DODP 330 may appear transparent to the receiving entity and to the DT 320. In addition, the DINO_Ready, the DINO_Accept, and the DINO_Data may be the same as the D_Ready, D_Accept, and the D_Data, respectively.

Figure 4A:
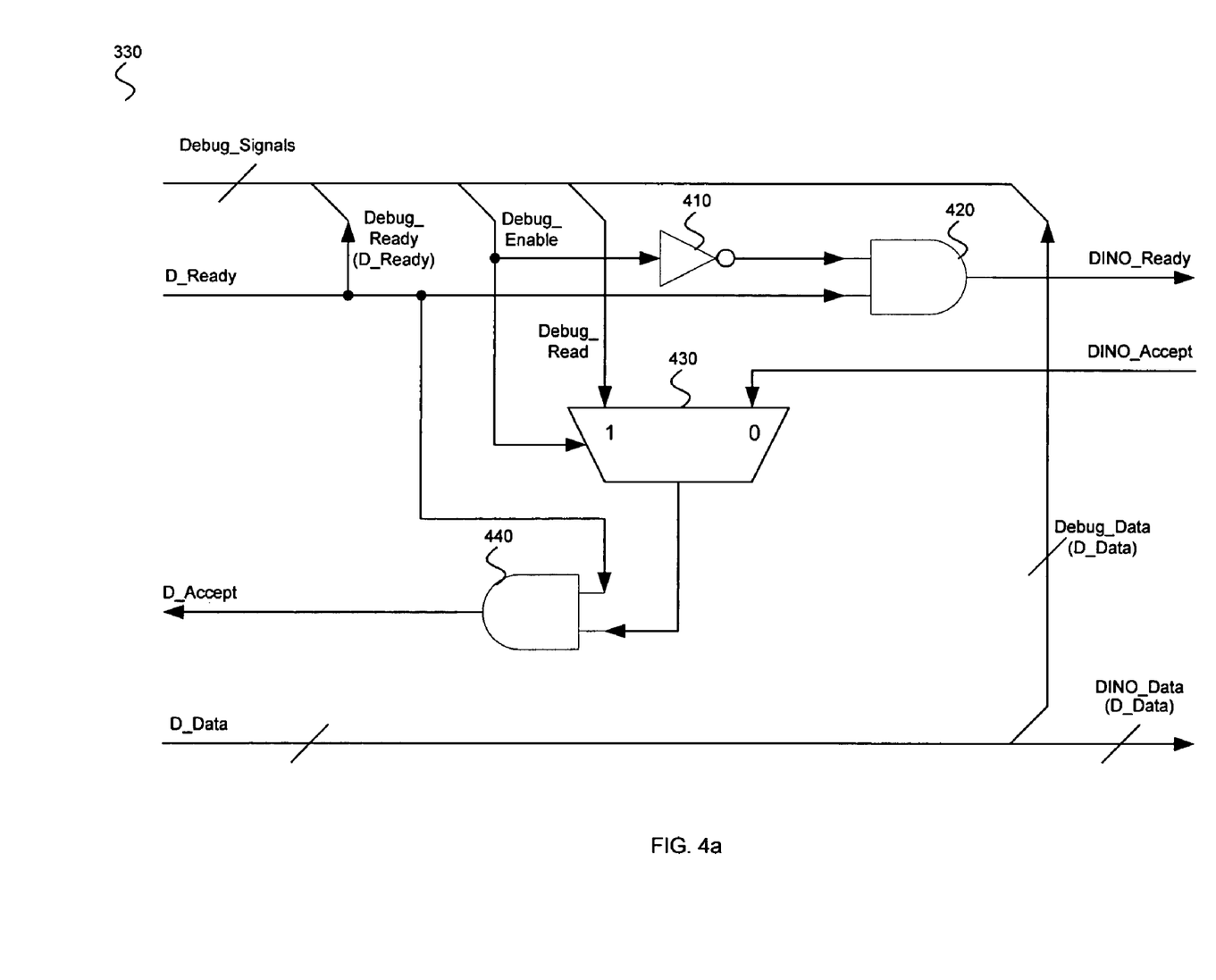
FIG. 4a is a block diagram illustrating an exemplary DINO Out Debug Port of FIG. 3, in accordance with an embodiment of the invention.

FIG. 4a is a block diagram illustrating an exemplary DINO Out Debug Port of FIG. 3, in accordance with an embodiment of the invention. Referring to FIG. 4a, there is shown an inverter 410, AND gates 420 and 440, and a multiplexer 430. FIG. 4a further comprises a plurality of signals including Debug_Signals, DINO_Ready, DINO_Accept, DINO_Data, D_Ready, D_Accept, and D_Data. The signal Debug_Signals may comprise a plurality of signals Debug_Data, Debug_Read, Debug_Ready and Debug_Enable. The plurality of signals Debug_Signals, DINO_Ready, DINO_Accept, DINO_Data, D_Accept, D_Ready, and D_Data may correspond to the signals of the same names in FIG. 3. The signal referred to as Debug_Ready may be the same as the D_Ready in FIG. 4a. The signal referred to as Debug_Data and the signal referred to as DINO_Data may be the same as the D_Data in FIG. 4a.

During the debug mode, the debugging entity may receive the Debug_Data that may be the same as the D_Data communicated by the transmitting entity. During normal operation, the DINO_Data may be communicated to the receiving entity. The Debug_Read may be a signal from the debugging entity that may be utilized to generate the D_Accept. The Debug_Enable may be a signal from the debugging entity that may be utilized to initiate the debug mode. The Debug_Ready may indicate to the debugging entity or the receiving entity that new data is ready.

The Debug_Enable may be communicated to the inverter 410 and an output of the inverter 410 may be coupled to a first input of the AND gate 420. The Debug_Enable may also be communicated to the multiplexer 430 such that the Debug_Enable indicates which of two inputs to the multiplexer 430 may be output. The D_Ready may be communicated to a second input of the AND gate 420, to a first input of the AND gate 440, and to the debugging entity as the Debug_Ready. The AND gate 420 may as an output the DINO_Ready.

A second input of the multiplexer 430 may be the DINO_Accept and an output of the multiplexer 430 may be coupled to the second input of the AND gate 440. The AND gate 440 output may be the D_Accept. The D_Data may be communicated to the debugging entity as the Debug_Data and also may be communicated as the DINO_Data to the receiving entity.

In operation, the Debug_Enable may be asserted, and the asserted Debug_Enable may be inverted by the inverter 410 and communicated to the AND gate 420. Therefore, while the Debug_Enable may be asserted, the AND gate 420 output, the DINO_Ready, may be deasserted, which may indicate to the receiving entity that there may not be new data for the receiving entity. The asserted Debug_Enable may also indicate to the multiplexer 430 that the first input, the Debug_Read, may be selected. When the D_Ready is asserted, the asserted Debug_Read may be communicated to the DT 320 (FIG. 3) as the D_Accept to indicate that new data may be sent. The DT 320 may communicate the D_Data and may assert the D_Ready. The asserted D_Ready may be communicated to the debugging entity such that the debugging entity may accept the new D_Data and assert the Debug_Read.

In normal mode, the Debug_Enable may be deasserted. Therefore the output of the inverter 410 may be asserted and the AND gate 420 output, the DINO_Ready, may be the same as the second input, the D_Ready, to the AND gate 420. The deasserted Debug_Enable may also indicate to the multiplexer 430 that the second input, the DINO_Accept, may be selected. In the normal mode, the DODP 320 (FIG. 3) may be transparent to the transmitting entity and to the receiving entity. Therefore, the DINO_Data and the DINO_Ready may be sent to the receiving entity and the D_Accept may be received from the receiving entity, thereby allowing data to be transmitted from the transmitting entity to the receiving entity.

Figure 4B:
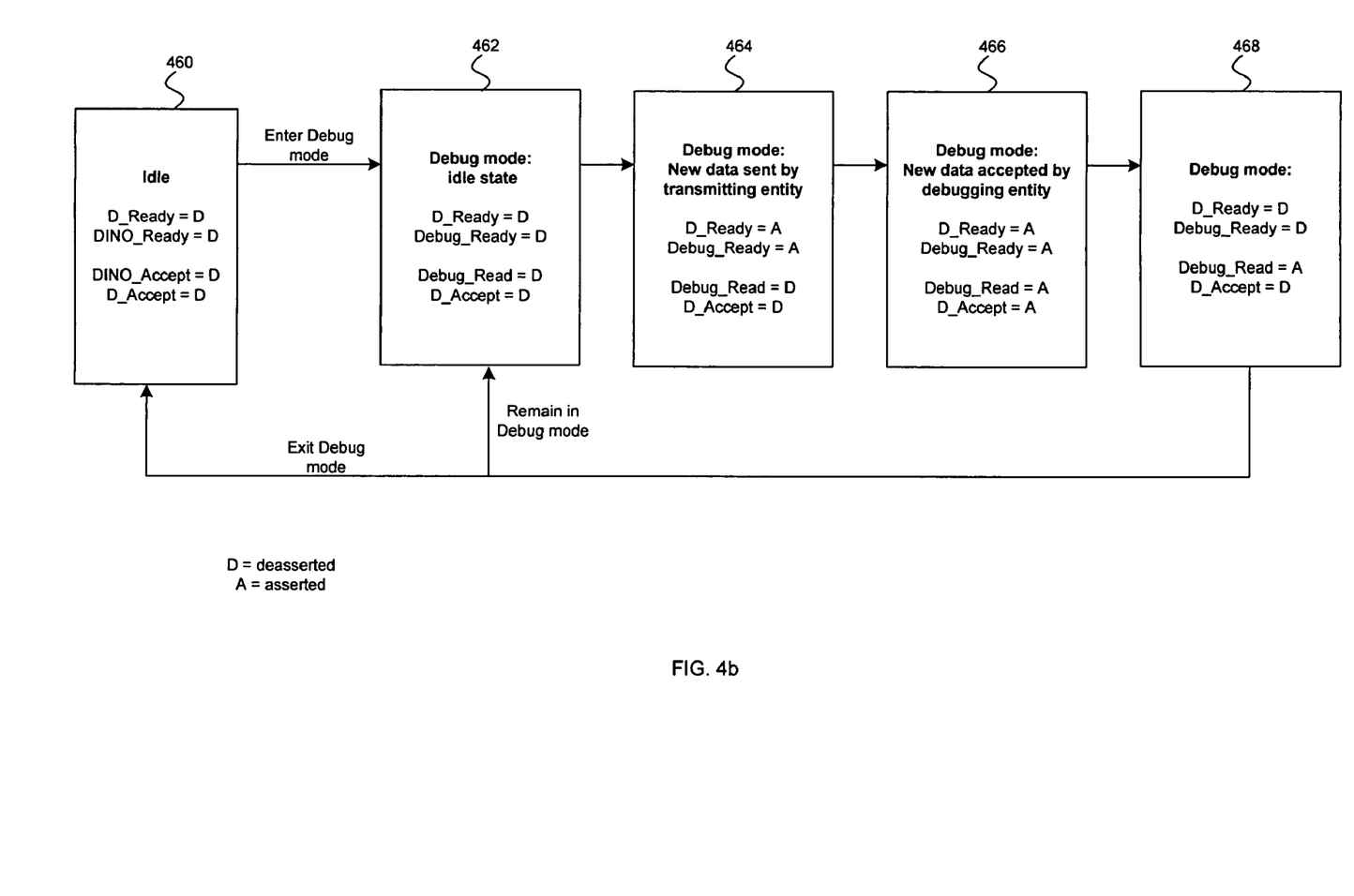
FIG. 4b is a flow chart illustrating exemplary steps for data flow from a transmitting entity to a debugging entity, as illustrated in FIG. 4a in accordance with an embodiment of the invention.

FIG. 4b is a flow chart illustrating exemplary steps for data flow from a transmitting entity to a debugging entity, as illustrated in FIG. 4a in accordance with an embodiment of the invention. Referring to FIG. 4b, step 460 may indicate an idle state where the transmitting entity may not have transmitted new data to the receiving entity, and the debugging entity may not have asserted the Debug_Enable. This state may also have the ready signals DINO_Ready and D_Ready in a deasserted state and the accept signals D_Accept and DINO_Accept in a deasserted state. In step 462, the debugging entity may have initiated a debug mode where it may disable the receiving entity from receiving data so that the debugging entity may receive data from the transmitting entity. In initiating the debug mode, the debugging entity may assert the Debug_Enable to the DODP 330 (FIG. 3), which may result in the DINO_Ready being deasserted to the receiving entity. Since the deasserted DINO_Ready may indicate to the receiving entity that no new data may have been sent via DINO_Data, the receiving entity may not assert the DINO_Accept.

In step 464, the transmitting entity may send data via the D_Data and assert the D_Ready. The D_Data may be communicated to the debugging entity as the Debug_Data and the D_Ready may be communicated to the debugging entity as the Debug_Ready. In step 466, the debugging entity may accept the data on the Debug_Data and assert Debug_Read, which may assert the D_Accept.

In step 468, the Debug_Read may be deasserted by the debugging entity, which may result in the D_Accept being deasserted. If the Debug_Enable remains asserted, then the next step may be step 462 and the debugging entity may deassert Debug_Read. If Debug_Enable is deasserted, the next step may be step 460.

The exemplary embodiments of the invention in FIGS. 1a and 3 may show the Bus_Signals to and from a debugging entity. Accordingly, the debugging entity may be on the same chip as the transmitting entity and the receiving entity, or it may be external to the chip that contains the transmitting entity and the receiving entity. Furthermore, although the exemplary embodiment of the invention in FIG. 1a may show the BIF 110 and the DIDP 120 as separate modules, the invention may not be so limited. Accordingly, the BIF 110 and the DIDP 120 may be parts of a same logic module. Similarly, in FIG. 3, the BIF 310 and the DODP 330 may also be parts of a same logic module. Additionally, although FIGS. 1a-4 show the DIDP 120 and the DODP 330 as separate modules, the invention may not be so limited. Accordingly, the DIDP 120 and the DODP 330 may be parts of the same module, and this module may also include the bus interface module shown in FIGS. 1a and 3.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for controlling data flow, comprising:
    coupling a transmitter debugging interface module to a transmitter;
    coupling a receiver debugging interface module to a receiver;

coupling said transmitter debugging interface module to said receiver debugging interface module, wherein said debugging interface modules are in a communication pathway between said transmitter and said receiver, wherein said debugging interface modules, said transmitter and said receiver are integrated on a chip;

during debugging of said receiver, disabling transmissions from said transmitter to said receiver at said receiver debugging interface module and enabling transmissions of debugging data from the receiver debugging interface module to said receiver; and during debugging of said transmitter, disabling signaling between the transmitter debugging interface module and said receiver.

2. The method according to claim 1, comprising communicating at least one handshaking signal between said transmitter and said transmitter debugging interface module.

3. The method according to claim 2, comprising communicating at least one handshaking signal between said receiver debugging interface module and said receiver.

4. The method according to claim 3, comprising communicating data from said transmitter said transmitter debugging interface module and said receiver debugging interface module.

5. The method according to claim 4, comprising communicating data from said receiver debugging interface module to said receiver.

6. The method according to claim 1, comprising communicating at least one debugging signal between at least one of said debugging interface modules and at least one debugging entity.

7. The method according to claim 6, wherein at least one of said at least one debugging entity is located on said chip, said at least one debugging entity being coupled to at least one of said debugging interface modules.

8. The method according to claim 6, wherein at least one of said at least one debugging entity is located externally to said chip, said at least one debugging entity being coupled to at least one of said debugging interface modules.

9. The method according to claim 6, comprising communicating data between said at least one debugging entity and at least one of said debugging interface modules.

10. The method according to claim 6, wherein said at least one debugging signal indicates to at least one of said debugging interface modules to initiate a debug mode.

11. The method according to claim 10, comprising communicating at least one handshaking signal between said transmitter and said receiver transparently through at least one of said debugging interface modules when at least one of said debugging interface modules has not initiated said debug mode.

12. The method according to claim 10, comprising communicating data from said transmitter to said receiver transparently through at least one of said debugging interface modules when at least one of said debugging interface modules has not initiated said debug mode.

13. The method according to claim 10, comprising communicating at least one handshake signal from at least one of said debugging interface modules to said transmitter to disable said transmitter from transmitting data to said receiver when at least one of said debugging interface modules has initiated said debug mode.

14. The method according to claim 10, comprising communicating by at least one of said debugging interface modules data received from said at least one debugging entity to said receiver when at least one of said debugging interface modules has initiated said debug mode.

15. The method according to claim 10, comprising communicating said at least one handshake signal from at least one of said debugging interface modules to said receiver to disable said receiver from acknowledging receipt of data when at least one of said debugging interface modules has initiated said debug mode.

16. The method according to claim 10, comprising communicating by at least one of said debugging interface modules data received from said transmitter to said at least one debugging entity when at least one of said debugging interface modules has initiated said debug mode.

17. A system for controlling data flow, comprising:
a transmitter debugging interface module coupled to a transmitter; and
a receiver debugging interface module coupled to a receiver, said receiver debugging interface module being coupled to the transmitter debugging interface module, said receiver and said transmitter being part of an integrated chip, said debugging interface modules being in a communication pathway between said transmitter and said receiver,
wherein, during debugging of said receiver, disabling transmissions from said transmitter to said receiver at said receiver debugging interface module and enabling transmissions of debugging data from the receiver debugging interface module to said receiver, and
wherein, during debugging of said transmitter, disabling signaling between the transmitter debugging interface module and said receiver.

18. The system according to claim 17, wherein at least one handshaking signal is communicated between said transmitter and at least one of said debugging interface modules.

19. The system according to claim 18, wherein at least one handshaking signal is communicated between at least one of said debugging interface modules and said receiver.

20. The system according to claim 19, wherein data is transmitted from said transmitter to said transmitter debugging interface module and said receiver debugging interface module.

21. The system according to claim 20, wherein said data is transmitted from said receiver debugging interface module to said receiver.

22. The system according to claim 17, comprising at least one debugging entity that communicates at least one debugging signal to at least one of said debugging interface modules.

23. The system according to claim 22, wherein at least one of said at least one debugging entity is located on said chip, said at least one debugging entity being coupled to at least one of said debugging interface modules.

24. The system according to claim 22, wherein at least one of said at least one debugging entity is located externally to said chip, said at least one debugging entity being coupled to at least one of said debugging interface modules.

25. The system according to claim 22, wherein data is communicated between said at least one debugging entity and at least one of said debugging interface modules.

26. The system according to claim 22, wherein said at least one debugging signal indicates to at least one of said debugging interface modules to initiate a debug mode.

27. The system according to claim 26, wherein said at least one handshaking signal is communicated between said transmitter and said receiver transparently through at least one of said debugging interface modules when at least one of said debugging interface modules has not initiated said debug mode.

28. The system according to claim 26, wherein said transmitter communicates data to said receiver transparently through at least one of said debugging interface modules when at least one of said debugging interface modules has not initiated said debug mode.

29. The system according to claim 26, wherein at least one of said debugging interface modules communicates at least one handshake signal to said transmitter to disable said transmitter from transmitting data to said receiver when at least one of said debugging interface modules has initiated said debug mode.

30. The system according to claim 26, wherein at least one of said debugging interface modules communicates data received from said at least one debugging entity to said receiver when at least one of said debugging interface modules has initiated said debug mode.

31. The system according to claim 26, wherein at least one of said debugging interface modules communicates at least one handshake signal to said receiver to disable said receiver from acknowledging receipt of data when at least one of said debugging interface modules has initiated said debug mode.

32. The system according to claim 26, wherein at least one of said debugging interface modules communicates data received from said transmitter to said at least one debugging entity when at least one of said debugging interface modules has initiated said debug mode.

* * * * *

UNITED STATES PATENT AND TRADEMARK OFFICE
CERTIFICATE OF CORRECTION

| | | |
|---|---|---|
| PATENT NO. | : 7,584,380 B2 | Page 1 of 1 |
| APPLICATION NO. | : 10/981178 | |
| DATED | : September 1, 2009 | |
| INVENTOR(S) | : Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 839 days.

Signed and Sealed this
Eleventh Day of January, 2011

David J. Kappos
*Director of the United States Patent and Trademark Office*